US008745378B1

(12) United States Patent
Galehouse et al.

(10) Patent No.: US 8,745,378 B1
(45) Date of Patent: Jun. 3, 2014

(54) SYSTEM AND METHOD FOR VALIDATING SCEP CERTIFICATE ENROLLMENT REQUESTS

(71) Applicants: Gary A. Galehouse, Cuyahoga Falls, OH (US); Wayne A. Harris, Brunswick, OH (US); Edward R. Shorter, Munroe Falls, OH (US); Kevin M. Tambascio, Lyndhurst, OH (US)

(72) Inventors: Gary A. Galehouse, Cuyahoga Falls, OH (US); Wayne A. Harris, Brunswick, OH (US); Edward R. Shorter, Munroe Falls, OH (US); Kevin M. Tambascio, Lyndhurst, OH (US)

(73) Assignee: Certified Security Solutions, Inc., Cleveland, OH (US)

( * ) Notice: Subject to any disclaimer, the term of this patent is extended or adjusted under 35 U.S.C. 154(b) by 0 days.

(21) Appl. No.: 13/762,890

(22) Filed: Feb. 8, 2013

Related U.S. Application Data

(60) Provisional application No. 61/609,639, filed on Mar. 12, 2012.

(51) Int. Cl.
*H04L 29/06* (2006.01)

(52) U.S. Cl.
USPC ............................................................ 713/156

(58) Field of Classification Search
CPC .... H04L 63/0428; H04L 9/36; H04L 63/0823
USPC ................................................ 713/156; 726/4
See application file for complete search history.

(56) References Cited

U.S. PATENT DOCUMENTS

| 7,007,091 B2 * | 2/2006 | Inada et al. ................... 709/226 |
| 8,386,785 B2 * | 2/2013 | Kim et al. ...................... 713/175 |
| 2005/0210237 A1 * | 9/2005 | Balaz et al. .................. 713/153 |
| 2013/0073856 A1 * | 3/2013 | Sherkin et al. ................ 713/176 |

\* cited by examiner

*Primary Examiner* — Kambiz Zand
*Assistant Examiner* — Abiy Getachew
(74) *Attorney, Agent, or Firm* — Porter, Wright, Morris & Arthur, LLP (57) ABSTRACT

A system and method for validating SCEP certificate enrollment that enforces the pairing of a SCEP challenge password and a set of expected certificate request content. A SCEP Validation Service or software residing in another system component whether a certificate request is legitimate by comparing it to registered SCEP challenges and associated expected certificate request content. This system and method addresses a privilege-escalation vulnerability in prior SCEP-based systems that could lead to a practical attack.

24 Claims, 7 Drawing Sheets

| SCEP Challenges | CORRESPONDING CERTIFICATE CONTENT SPECIFICATION | | | | |
|---|---|---|---|---|---|
| | CERT SUBJECT | CERT SUBJ. ALT NAME | KEY USAGE | EXTENDED KEY USAGE | CERT TEMPLATE |
| "EBF38299GHA994ST" | CN="JOHN SMITH" | UPN=JSMITH@CORP.COM | 128 | CLIENT AUTHENTICATION; DOCUMENT SIGNING | "XYZ CORP USER TEMPLATE" |
| "X99ABFF49923MM" | CN="FRED JONES" O="XYZ CORP" | UPN=FJONES@CORP.COM RFC822NAME=FRED.JONES@CORP.COM | (ANY) | (ANY) | "AUTHENTICATED SESSION" |
| "45JK3342SDFMEEY5" | CN="MIKE WALLCE" OU="IPAD TESTING" | UPN=, MWALLACE@CORP.COM | 64 | (ANY) | "XYZ CORP USER TEMPLATE" |
| "4409keL2SDNmE" | (ANY) | UPN=, BWILLIAMS@CORP.COM | (ANY) | (ANY) | "IPAD TEST GENERAL" |

FIG. 11

SYSTEM AND METHOD FOR VALIDATING SCEP CERTIFICATE ENROLLMENT REQUESTS

CROSS-REFERENCE TO RELATED APPLICATIONS

This application claims the priority benefit of U.S. Provisional Patent Application No. 61/609,639 filed on Mar. 12, 2012, the disclosure of which is expressly incorporated herein in its entirety by reference.

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention generally relates to computer network security, and more specifically, to systems and methods for implementing and managing security policies for computing devices requesting access to a SCEP-based network.

BACKGROUND OF THE INVENTION

The Simple Certificate Enrollment Protocol (SCEP) was developed by Verisign, Inc., of Restin, Va., for Cisco Systems, Inc., of San Jose, Calif., primarily to allow network administrators to easily enroll network computing devices for certificates in a scalable manner. Because these network computing devices are unlikely to have their identities represented in an enterprise directory or credential store, SCEP includes no provision for authenticating the identity of the requester. Instead, SCEP allows for two different authorization mechanisms. The first authorization mechanism is manual, where the requester is required to wait after submission for the Certification Authority (CA) administrator or certificate officer to approve the request. The second authorization method is pre-shared secret, where the SCEP server creates a "challenge password" that must be somehow delivered to the requester included with a submission back to the server.

The overall security model surrounding SCEP's creation is that of a relatively well-controlled environment. In the use cases which SCEP was initially designed to solve, challenge passwords are retrieved by a highly trusted CA administrator, and given to a highly trusted network administrator, to generate certificates for highly trusted network computing devices. In many cases, the SCEP challenge may well be retrieved and used by the same administrator.

Microsoft Corporation, of Redmond Wash., has supported SCEP for its CA software since Windows Server 2003, first as freely downloadable add-on component, and then with Windows Server 2008 as a native component (via the Network Device Enrollment Service (NDES) role). Microsoft Corporation's SCEP implementation is relatively full featured, and allows for a variety of configuration options including: setting the length of the SCEP challenge passwords; turning the requirement of SCEP challenges on or off; allowing or disallowing the reuse of SCEP challenges; and setting the maximum time that an unused SCEP challenge should be considered valid.

When Apple Inc., of Cupertino, Calif., added SCEP to its mobile operating system (referred to as iOS) the global count of SCEP-speaking client computing devices was increased by several orders of magnitude. Additionally, it moved SCEP away from the security-friendly environment in which the protocol was initially used. Instead of using certificates to tightly controlled network computing devices under the direction of highly trusted administrators, it is now possible to architect systems that allow SCEP enrollment of "less-trusted" computing devices and their users, over the interne. In fact, many Mobile Device Management (MDM) systems rely on this type of architecture. This shift in possible security models is important, and will be further discussed below.

One critically important aspect of the SCEP challenge password is that, while it provides authorization to submit a PKCS#10 formatted certificate request, it does not actually authenticate the requester, nor does it even identify them. Note that PKCS is a public-key cryptography standard produced by RSA Laboratories of Bedford Mass. Furthermore, neither the SCEP challenge, nor the SCEP server itself, makes any statement about the type or content of the request that may be submitted. In essence, possession of a valid SCEP challenge password entitles the bearer to submit a certificate request with content entirely of their own choosing to the SCEP server. This is fine in the original "admin-only" security model for which SCEP was initially created, but is cause for concern when put to use on the internet at large.

It may be possible for a user or computing device to take their legitimately acquired SCEP challenge password, and use it to obtain a certificate that represents a different user or computing device with a higher level of access, or even to obtain a different type of certificate than what was intended. If the challenge passwords are reused or disabled, the consequences are even direr, as the attacker would not need to be a legitimate user.

This issue is not really the "fault" of Apple, Inc., Cisco Systems, Inc., Microsoft Corporation, or of the myriad of Mobile Device Management systems that leverage SCEP. Rather it was brought about by the combination of several factors. First, SCEP challenge passwords give someone permission to submit a certificate request to the SCEP server, but make no claims or enforcement over the content of that submission. Second, iOS operated computing devices' support of SCEP has opened up avenues for SCEP requests to originate from un-trusted networks, and from less-trusted (non-administrative) users, and many Mobile Device Management systems require this. Third, many enterprise CA installations, including most default installations of Microsoft Corporation's CA, are being used to issue certificates that serve as network authentication credentials. It's also important to note that the execution of the attack does not require the use of an Apple computing device—it only requires a valid SCEP challenge password, and the ability to communicate with the SCEP server. Thus, internally-developed SCEP servers, or servers protected by a reverse proxy or firewall are also susceptible. Accordingly, there is a need for an improved architecture for validating SCEP certificate enrollment requests.

SUMMARY OF THE INVENTION

Disclosed herein is a data security system and method for both mobile computing devices and non-mobile computing devices which overcome at least one of the above-described deficiencies of the prior art. Disclosed is a computer implemented method for validating SCEP certificate enrollment requests comprising the steps of, in combination, allowing trusted users to register SCEP challenges and associated sets of expected certificate content for the SCEP challenges, electronically receiving a certificate request via a communications network, and electronically validating the certificate request by checking whether a SCEP challenge of the certificate request matches one of the previously registered SCEP challenges and if so checking whether content of the certificate request matches the previously registered expected certificate content associated with the matching registered SCEP challenge. A certificate is authorized if the SCEP challenge of the certificate request matches a previously registered SCEP challenge and the content of the certificate request matches the registered expected certificate content associated with the matching registered SCEP challenge. The certificate is denied if the SCEP challenge of the certificate request does not match a previously registered SCEP challenge or if the content of the certificate request does not match the registered expected certificate content associated with the matching registered SCEP challenge.

Also disclosed is a system for validating SCEP certificate enrollment requests comprising, in combination, a SCEP Server for electronically receiving requests from trusted users to register SCEP challenges and associated sets of expected certificate content for the SCEP challenges and for electronically receiving a certificate request from a computing device via a communication network, a SCEP Issuance System for issuing SCEP challenges to the trusted users, and a SCEP Validation Service to electronically validate the certificate request. The SCEP Validation Service electronically validates the certificate request by checking whether a SCEP challenge of the certificate request matches a previously registered SCEP challenge and if so checking whether content of the certificate request matches the previously registered expected certificate content associated with the matching registered SCEP challenge. The SCEP Validation Service authorizes a certificate if the SCEP challenge of the certificate request matches a registered SCEP challenge and the content of the certificate request matches the registered expected certificate content associated with the matching registered SCEP challenge. The SCEP Validation Service denies the certificate if the SCEP challenge of the certificate request does not have a matching registered SCEP challenge or the content of the certificate request does not match the registered set of expected certificate content associated with the matching registered SCEP challenge.

Also disclosed is a system for validating SCEP certificate enrollment requests comprising, in combination, a SCEP Server for electronically receiving requests from trusted users to register SCEP challenges and associated sets of expected certificate content for the SCEP challenges and for electronically receiving a certificate request from a computing device via a communication network, a SCEP Issuance System for issuing SCEP challenges to the trusted users, and validation software configured to validate the certificate request. The validation software validates a certificate request by checking whether a SCEP challenge of the certificate request matches a previously registered SCEP challenge and if so checking whether content of the certificate request matches the previously registered expected certificate content associated with the matching registered SCEP challenge. The validation software authorizes a certificate if the SCEP challenge of the certificate request matches a registered SCEP challenge and the content of the certificate request matches the registered expected certificate content associated with the matching registered SCEP challenge. The validation software denies the certificate if the SCEP challenge of the certificate request does not have a matching registered SCEP challenge or the content of the certificate request does not match the registered set of expected certificate content associated with the matching registered SCEP challenge.

From the foregoing disclosure and the following more detailed description of various preferred embodiments it will be apparent to those skilled in the art that the present invention provides a significant advance in the technology and art of systems and methods for mobile data security. Particularly significant in this regard is the potential the invention affords for providing relatively inexpensive and effective mobile data security. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

DETAILED DESCRIPTION OF CERTAIN PREFERRED EMBODIMENTS

It will be apparent to those skilled in the art, that is, to those who have knowledge or experience in this area of technology, that many uses and design variations are possible for the systems methods for data security disclosed herein. The following detailed discussion of various alternative and preferred embodiments will illustrate the general principles of the invention with respect to iOS operated mobile computing devices but other embodiments and variations suitable for other applications will be apparent to those skilled in the art given the benefit of this disclosure. For example, applications where the mobile computing devices are additionally or alternatively running other operating systems and/or the computing devices are additionally or alternatively non-mobile devices. Mobile computing devices are small handheld computing devices such as, for example, mobile phones, smart phones, tablet computers, personal digital assistants (PDA), enterprise digital assistants, calculators, handheld game consoles, portable media players, digital still cameras, digital video cameras, pagers, personal navigation devices (PND), and the like. Non-Mobile devices are computing devices that are not small handheld devices such as, for example, desktop computers, portable computers (laptops, notebooks, etc.), net books, workstations, servers, mainframes, supercomputers, and the like.

Figure 1:
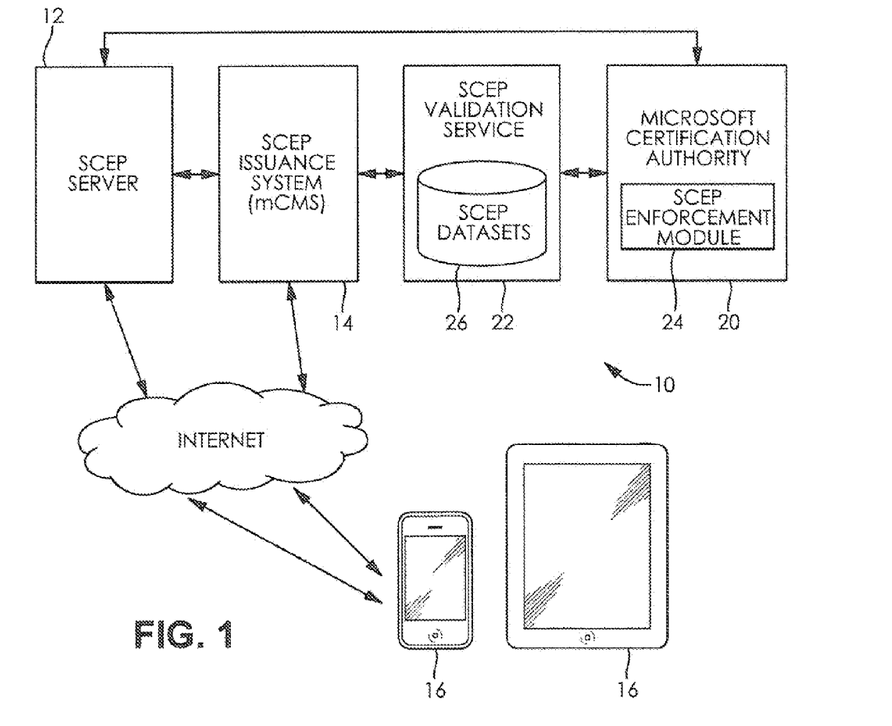
FIG. 1 is a schematic view of a data security system for receiving requests from computing devices via a communication network according to a first illustrated embodiment of the present invention.

NM Referring now to the drawings, FIG. 1 illustrates a data security system 10 for validating SCEP certificate enrollment requests according to a first illustrated embodiment of the present invention. The illustrated data security system 10 includes a SCEP server 12 and a SCEP Issuance System each of which are in communication with a plurality of computing devices 16 via a communication network 18. The SCEP Server 12 can be any suitable type of server and is in direct communication with a Certificate Authority 20. The illustrated Certificate Authority 20 is a Microsoft Certification Authority but any other suitable Certificate Authority 20 can alternatively be utilized. The illustrated SCEP Issuance System 14 is the mobile Certificate Management System (mCMS) available from Certified Security Solutions, Inc. (CSS Inc.), of Independence, Ohio, but can alternatively be any other suitable SCEP Issuance System 14. The illustrated computing devices 16 are mobile computing devices running iOS such as, for example, iPhones, iPads, and iPod Touches and the like available from Apple Inc, but the computing devices 16 can alternatively be any other suitable type of computing device 16 and/or can be running any other suitable operating system such as, for example, Mac OS, Android, Windows Phone, and the like. The illustrated communication network 18 is the Internet but can alternatively be any other suitable communication network.

A SCEP Validation Service 22 which provides validation service for the SCEP Issuance System 14 is located between the SCEP Issuance System 14 and the Certificate Authority 20. That is, the SCEP Issuance System 14 directly communicates with the SCEP Validation Service 22 and the SCEP Validation Service 22 is in direct communication with the Certification Authority 20. The primary function of the SCEP Validation Service 22 is to enforce the pairing of a SCEP challenge password and a set of expected certificate request content. The SCEP Validation Service 22 can be instructed in a variety of mechanisms to enforce these pairings.

The illustrated SCEP Validation Service 22 is implemented as a typical Service-oriented Architecture (SOA) component, to enable loose binding through a service contract, as well as provide multi-platform interoperability. The services of the illustrated SCEP Validation Service 22 are exposed as a SOAP-based webservice running on HTTPS. It is possible to alternatively run the same service on TCP or Named Pipes etc., but a true "webservice" runs over HTTPS. The illustrated web service is built with .NET technologies, and utilizes WCF as the webservice framework. The Microsoft's Internet Information Services (IIS) web server directly hosts both the SCEP Issuance System 14 as well as the SCEP Validation Service 22. These two systems can be on the same physical machine or can be separated to different machines as desired. HTTP-based web applications and webservices are typically stateless at the protocol level. However, a stateful component is needed to act as the data model for the SCEP challenge data because use of the stateless nature of HTTP. The illustrated data security system 10 needs a component that can keep the SCEP challenge in-memory between when the data is submitted by the SCEP Issuance System 14 to when the validation request is made by the SCEP Enforcement Module 24. The illustrated SCEP Validation Service 22 fills that role and is implemented as a stateful Singleton component, allowing the same instance to remain active for the entire lifetime of the certificate enrollment process.

A SCEP Enforcement Module 24 is used to integrate with the Certificate Authority 20 with the SCEP Validation Service 22 and is hosted by the Certificate Authority 20. The illustrated SCEP Enforcement Module 24 is implemented as a Policy Module for the Microsoft Certification Authority 20 and adheres to the ICertPolicy2 COM interface, Microsoft' Corporation's architecture requires that all policy modules be implemented as COM objects supporting the ICertPolicy2 interface. There are several technology alternatives when creating a COM object but a COM object is required regardless of the technology used. Because the illustrated Microsoft Certification Authority 24 can only have one policy module, the SCEP Enforcement Module 24 acts primarily as a "shim"—passing all communication through to the original policy module, until a certificate request containing a SCEP challenge is received. The SCEP Enforcement Module 24 then obtains the relevant information from the certificate request using a combination of standard policy module functions and via parsing the certificate request, and passes the information to the SCEP Validation Service 22 for checking. If the SCEP Validation Service 22 indicates that the information does not match what is expected, the SCEP Enforcement Module 24 denies the request.

Figure 2:
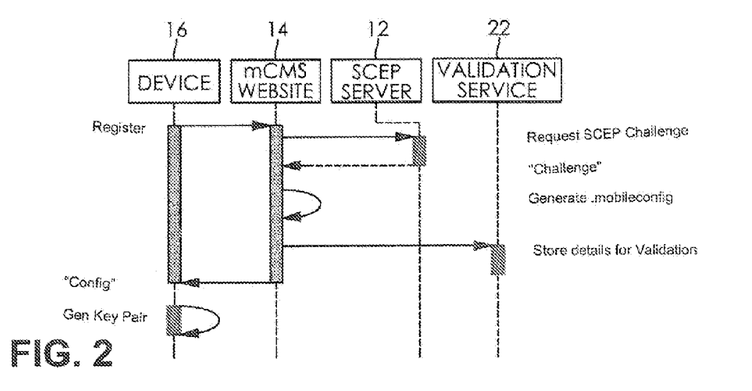
FIG. 2 is a schematic view of a first part of a SCEP enrollment process for the data security system of FIG. 1.

As best shown in FIG. 2, the SCEP Validation Service 22 allows the SCEP Issuance System 24 to register permitted SCEP challenge datasets from trusted users. The term "trusted user" is used herein and in the claims to mean a person or computing device worthy of making a certificate and content submission. In most eases the trusted user making the request will be software such as CSS Inc.'s mCMS, which instructs the devices to enroll for the certificates These registered SCEP challenge datasets are stored until the service is either unloaded from memory, or the individual dataset is removed from the validation side of the service. The SCEP challenge datasets can be stored in any suitable memory or storage such as, for example, RAM (SRAM, DRAM), flash, ROM/PROM/EROM/EEROM/virtual memory, cache memory, persistent memory, hard drive, tape drive, magnetic discs, optical discs, and the like. The iOS operated computing device 16 initiates a conversation via the communication network 18 with the SCEP Issuance System 14, which in the illustrated embodiment is an mCMS website, to register. The SCEP Issuance System 14 sends a request for a SCEP challenge, that is, a SCEP challenge password, to the SCEP Server 12 and the SCEP Server 12 returns a SCEP challenge to the SCEP Issuance System 14. The SCEP Issuance System 14 then uses the SCEP Validation Service 22 to store the generated SCEP challenge dataset. The SCEP challenge datasets can be stored in any suitable memory or storage such as, for example, RAM (SRAM, DRAM), flash, ROM/PROM/

EROM/EEROM/virtual memory, cache memory, persistent memory, hard drive, tape drive, magnetic discs, optical discs, and the like. Note that the illustrated SCEP Validation Service 22 is provided with a suitable database 26 for storing SCEP challenge datasets. The SCEP Issuance System 14 also generates a mobile configuration, in the form of a .mobileconfig file for an iOS operated computing device 16, and sends the mobile configuration to the computing device 16 via the communication network 18. The computing device 16 then generates a key pair. An RSA key pair is needed to generate the PKCS#10 request. The public key is submitted in the PKCS#10 request and is embedded into the certificate the CA issues. This design allows the private key to be generated on the computing device 16, which increases security by not having to pass the key over the communication network 18.

Figure 3:
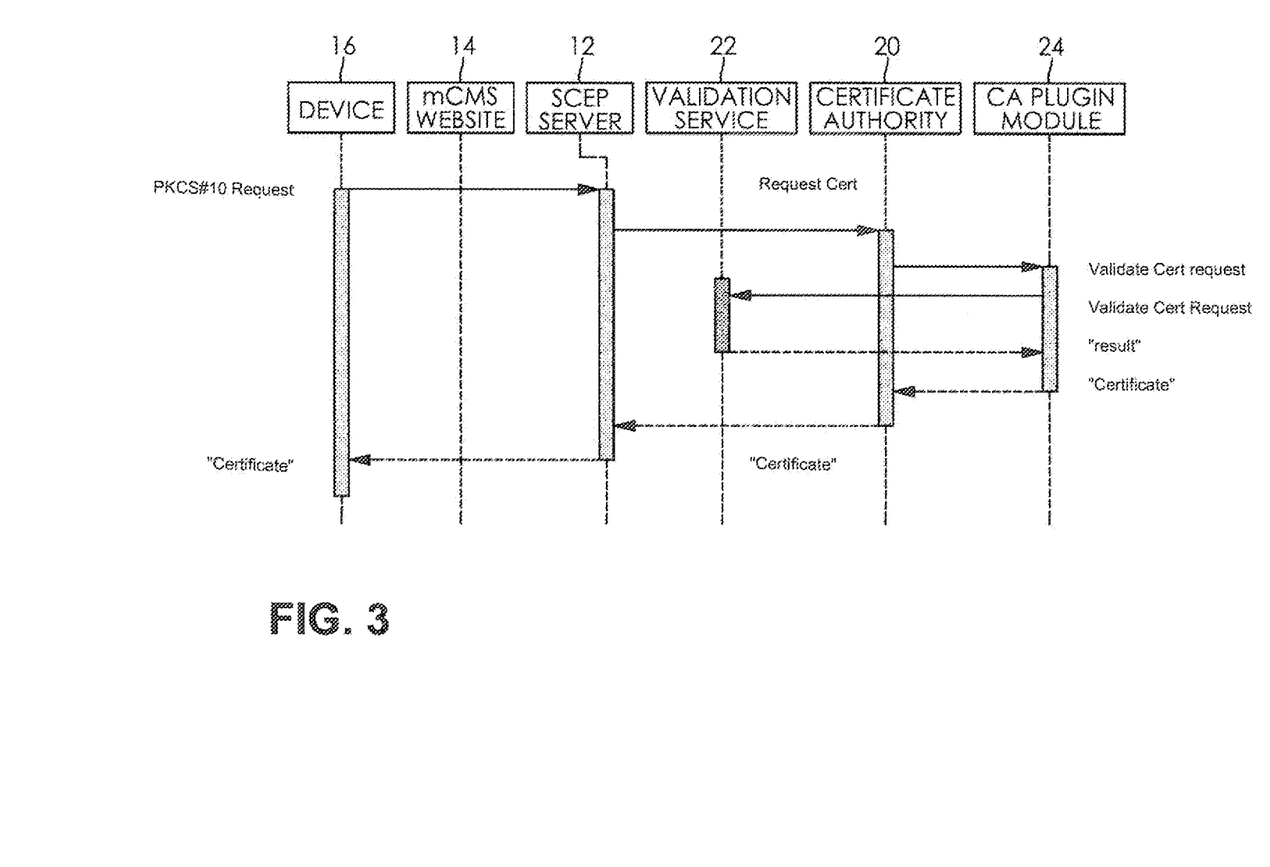
FIG. 3 is a schematic view of a second part of the SCEP enrollment process for the data security system of FIG. 1.
Figure 11:
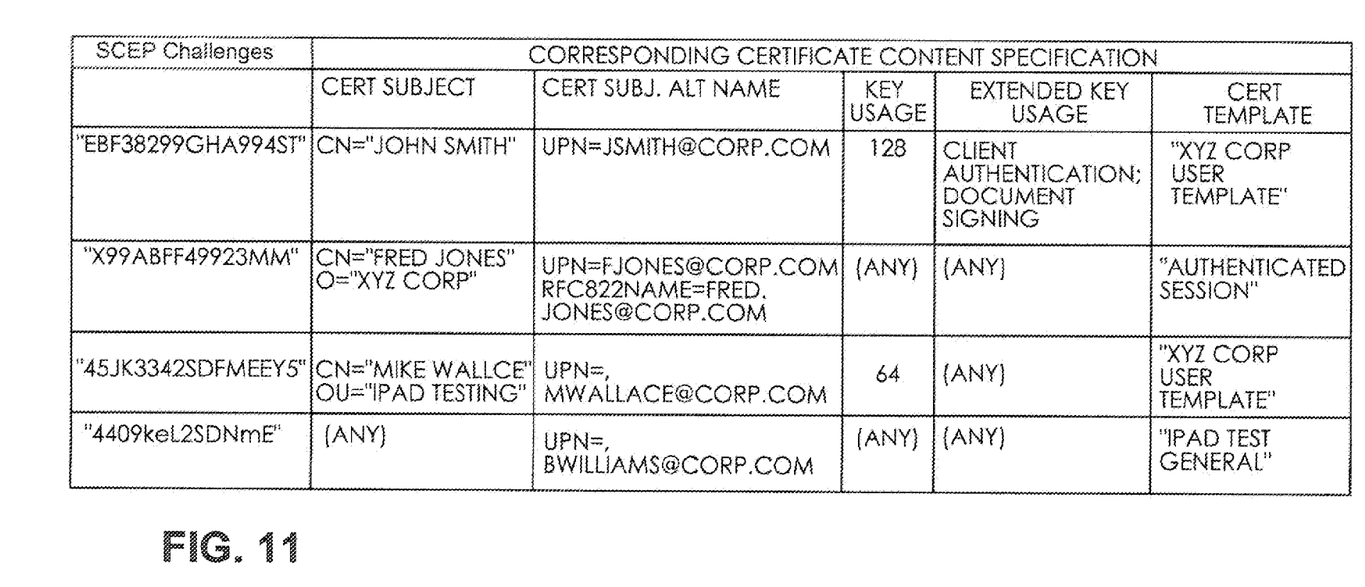
FIG. 11 is a table showing examples of SCEP challenges and associated validation data for the data security systems and methods of FIGS. 1 to 10.

As best shown in FIG. 3, when the SCEP Server 12 receives a certification request in the form of a PKCS#10 request from the computing device 16, the SCEP Server 12 determines whether the requester is allowed to request that particular certificate. This determination is made by sending a request for certificate to the Certificate Authority 20 which is received by the plug-in policy module or SCEP Enforcement Module 24 which checks with the SCEP Validation Service 22 to validate the request. The SCEP Validation Service 22 checks if the request matches any of the registered SCEP challenge datasets which have been previously stored, including the SCEP Challenge and the expected content of the certificate request. FIG. 11 shows examples of SCEP challenges and associated validation data. If a matching SCEP challenge dataset is found, a positive response is returned to the computing device 16, and the SCEP challenge dataset is removed from the internal data store. The positive response is returned to the computing device 16 by the SCEP Validation Service 22 sending a positive response to the plug-in Policy Module 24, the plug-in Policy Module 24 sending an authorization response to the Certificate Authority 20, the Certificate Authority 20 sending an authorization response to the SCEP Server 12, and the SCEP Server 12 generating and sending a certificate to the computing device 16 which imports the certificate. The allowed SCEP challenges are stored and managed by the SCEP Validation Service 22. The allowed SCEP challenges can be stored in any suitable memory or storage such as, for example, RAM (SRAM, DRAM), flash, ROM/PROM/EROM/EEROM/virtual memory, cache memory, persistent memory, hard drive, tape drive, magnetic discs, optical discs, and the like. If a matching SCEP challenge dataset is not found, a negative response is returned to the computing device 16, and a certificate is not provided to the computing device 16.

Figure 4:
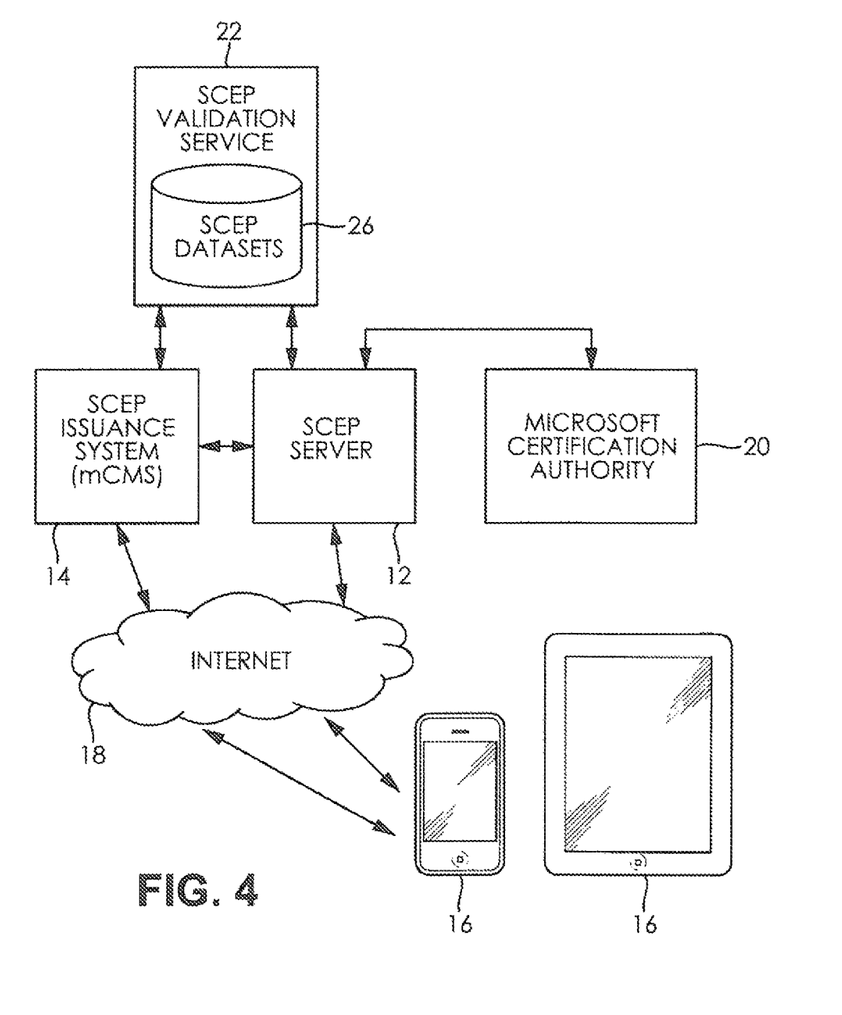
FIG. 4 is a schematic view of a data security system for receiving requests from computing devices via a communication network according to a second illustrated embodiment of the present invention.

FIG. 4 illustrates a data security system 10A for validating SCEP certificate enrollment requests according to a second illustrated embodiment of the present invention. The data security system 10A according to the second illustrated embodiment is substantially the same as the data security system 10 according the first illustrated embodiment described hereinabove except that the SCEP Validation Service 22 is moved in front of the SCEP Server 12. That is, the SCEP Server 12 utilizes the SCEP Validation Service 22 to validate certificate requests prior to sending the certificate requests to the Certification Authority 20. The illustrated system 10A includes the SCEP server 12 and the SCEP Issuance System which are in direct communication with each other and are each in communication with computing devices 16 via the communication network 18. The SCEP Server 12 is in direct communication with the Certificate Authority 20. The SCEP Validation Service 22 which provides validation service for the SCEP Issuance System 14 is in direct communication with the SCEP Server 12 and the SCEP Issuance System 14 with the SCEP Server 12 located between the SCEP Validation Service 22 and the Certificate Authority 20. The primary function of the SCEP Validation Service 22 is to enforce the pairing of a SCEP challenge password and a set of expected certificate request content.

Figure 5:
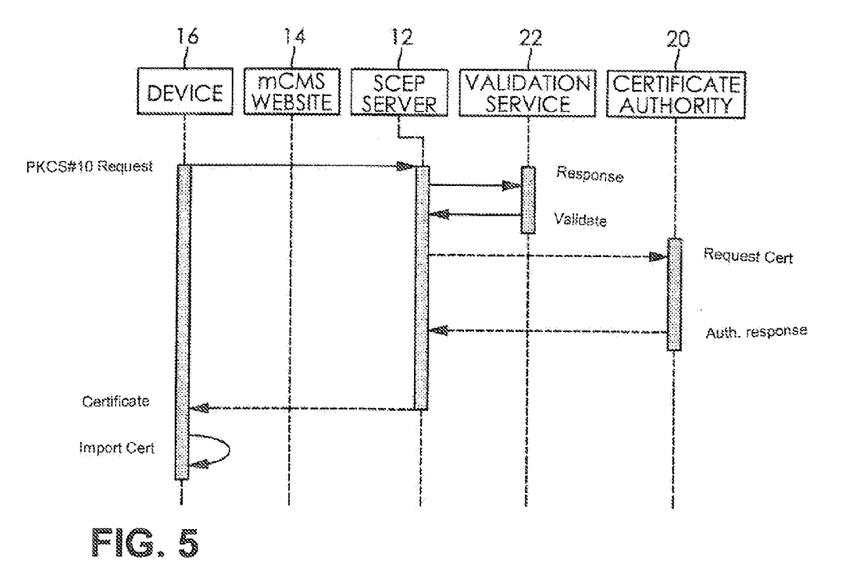
FIG. 5 is a schematic view of a second part of a SCEP enrollment process for the data security system of FIG. 4, wherein the first part of the SCEP enrollment process is similar to that shown in FIG. 2.

As best shown in FIG. 5, when the SCEP Server 12 receives a certification request in the form of a PKCS#10 request from the computing device 16, the SCEP Server 12 determines whether the requester is allowed to request that particular certificate. This determination is made by asking the SCEP Validation Service 22 to validate the request. The SCEP Validation Service 22 checks if the request matches any of the registered SCEP challenge datasets which have been previously stored, including the SCEP Challenge and the expected content of the certificate request. If a matching SCEP challenge dataset is found, a positive response is returned to the computing device 16, and the SCEP challenge dataset is removed from the internal data store. The positive response is returned to the computing device 16 by the SCEP Validation Service 22 sending a positive response to SCEP Server 12, the SCEP Server 12 sending a certificate request to the Certificate Authority 20, the Certificate Authority 20 sending an authorization response to the SCEP Server 12, and the SCEP Server 12 generating and sending a certificate to the computing device 16 which imports the certificate. The allowed SCEP challenges are stored and managed by the SCEP Validation Service 22. If a matching SCEP challenge dataset is not found, the certificate request is blocked from the Certification Authority 20, a negative response is returned to the computing device 16, and a certificate is not provided to the computing device 16.

Figure 6:
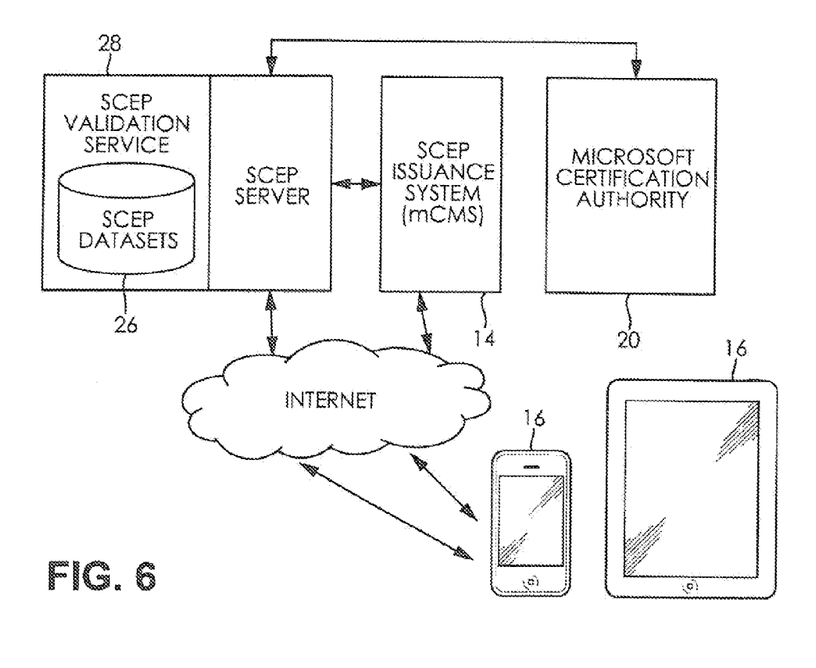
FIG. 6 is a schematic view of a data security system for receiving requests from computing devices via a communication network according to a third illustrated embodiment of the present invention.

FIG. 6 illustrates a data security system 10B for validating SCEP certificate enrollment requests according to a third illustrated embodiment of the present invention. The data security system 10B according to the third illustrated embodiment is substantially the same as the data security system 10A according the second illustrated embodiment described hereinabove except that the validation functions are preformed by the SCEP Server 12. That is, the SCEP Server 12 itself validates certificate requests using software residing in the SCEP Server 12 prior to sending the certificate requests to the Certification Authority 20. The illustrated system 1013 includes the SCEP server 12 and the SCEP Issuance System which are in direct communication with each other and are each in communication with computing devices 16 via the communication network 18. The SCEP Server 12 is in direct communication with the Certificate Authority 20. SCEP Validation Software 28 which provides validation service for the SCEP Issuance System 14 is resides in the SCEP Server 12. The primary function of the SCEP Validation Software 28 is to enforce the pairing of a SCEP challenge password and a set of expected certificate request content.

Figure 7:
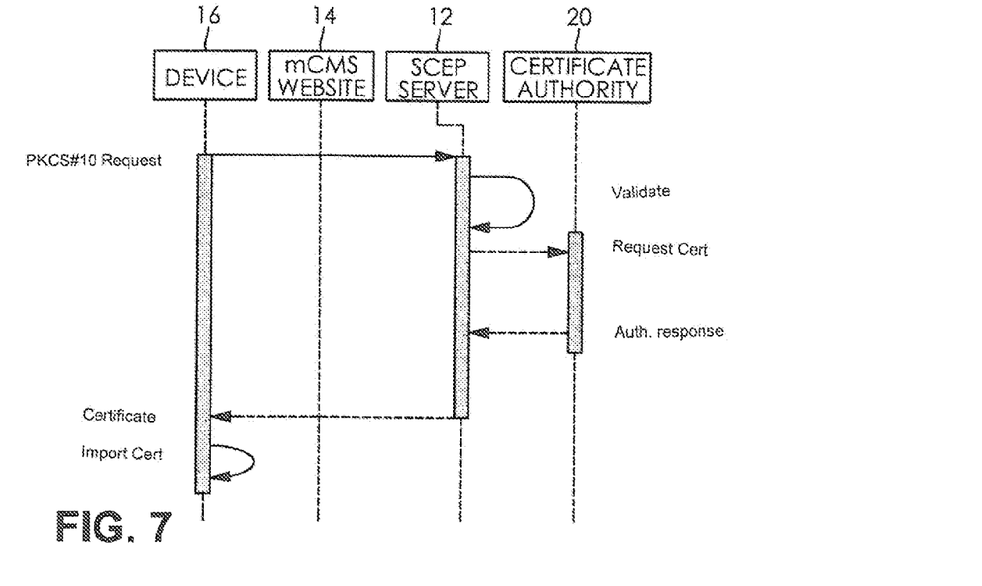
FIG. 7 is a schematic view of a second part of a SCEP enrollment process for the data security system of FIG. 6, wherein the first part of the SCEP enrollment process is similar to that shown in FIG. 2.

As best shown in FIG. 7, when the SCEP Server 12 receives a certification request in the form of a PKCS#10 request from the computing device 16, the SCEP Server 12 determines whether the requester is allowed to request that particular certificate. This determination is made internally using the SCEP Validation Software 28 to validate the request. The SCEP Validation Software 28 checks if the request matches any of the registered SCEP challenge datasets which have been previously stored, including the SCEP Challenge and the expected content of the certificate request. If a matching SCEP challenge dataset is found, a positive response is returned to the computing device 16, and the SCEP challenge dataset is removed from the internal data store. The positive response is returned to the computing device 16 by the SCEP Validation Software 28 providing a positive response, the SCEP Server 12 sending a certificate request to the Certificate Authority 20, the Certificate Authority 20 sending an authorization response to the SCEP Server 12, and the SCEP Server 12 generating and sending a certificate to the computing device 16 which imports the certificate. The allowed SCEP challenges are stored and managed by the SCEP Validation Service 22. If a matching SCEP challenge dataset is not found, the certificate request is blocked from the Certification Authority 20, a negative response is returned to the computing device 16, and a certificate is not provided to the computing device 16.

Figure 8:
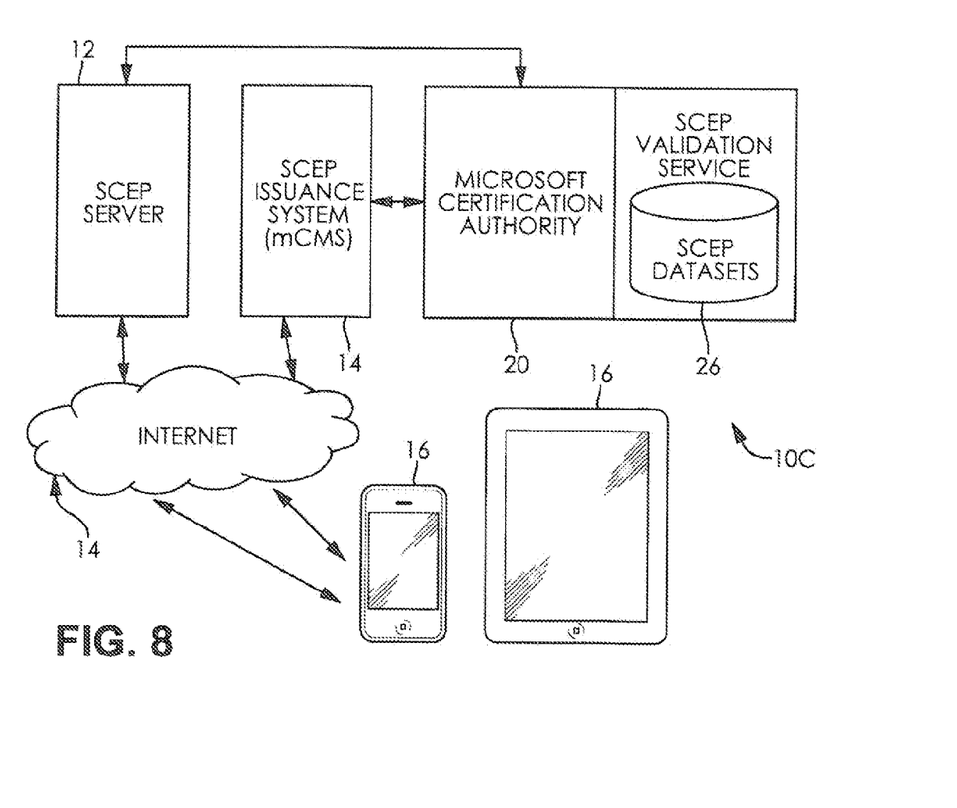
FIG. 8 is a schematic view of a data security system for receiving requests from computing devices via a communication network according to a fourth illustrated embodiment of the present invention.

FIG. 8 illustrates a data security system 10C for validating SCEP certificate enrollment requests according to a fourth illustrated embodiment of the present invention. The data security system 10C according to the fourth illustrated embodiment is substantially the same as the data security system 10 according the first illustrated embodiment described hereinabove except that the validation functions are preformed by the certification Authority 20. That is, the Certification Authority 20 itself validates certificate requests using software residing in the Certification Authority 20 prior to sending authorization to the SCEP Server. The illustrated system 10C includes the SCEP server 12 and the SCEP Issuance System which are directly in communication with each other and are each in communication with computing devices 16 via a communication network 18. The SCEP Server 12 is in direct communication with the Certificate Authority 20. The SCEP Validation Software 28 which provides validation service for the SCEP Issuance System 14 and the Certificate Authority 20 resides within the Certificate Authority 20.

Figure 9:
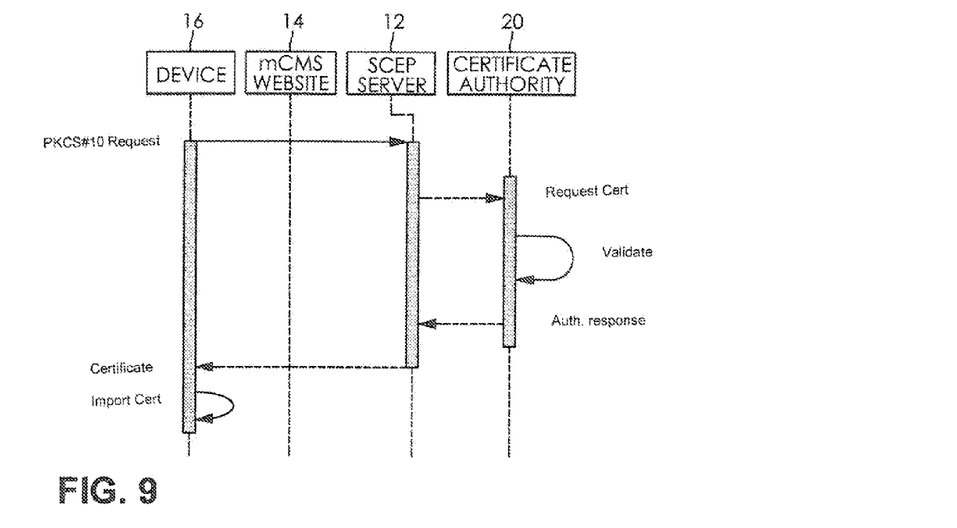
FIG. 9 is a schematic view of a second part of a SCEP enrollment process for the data security system of FIG. 8, wherein the first part of the SCEP enrollment process is similar to that shown in FIG. 2.

As best shown in FIG. 9, when the SCEP Server 12 receives a certification request in the form of a PKCS#10 request from the computing device 16, the SCEP Server 12 determines whether the requester is allowed to request that particular certificate. This determination is made by sending a request for certificate to the Certificate Authority 20 which checks with the SCEP Validation Software 28 to validate the request. The SCEP Validation Software 28 checks if the request matches any of the registered SCEP challenge datasets which have been previously stored, including the SCEP Challenge and the expected content of the certificate request. If a matching SCEP challenge dataset is found, a positive response is returned to the computing device 16, and the SCEP challenge dataset is removed from the internal data store. The positive response is returned to the computing device 16 by the SCEP Validation Software 28 providing a positive response, the Certificate Authority 20 sending an authorization response to the SCEP Server 12, and the SCEP Server 12 generating and sending a certificate to the computing device 16 which imports the certificate. The allowed SCEP challenges are stored and managed by the SCEP Validation Software 22. If a matching SCEP challenge dataset is not found, a negative response is returned to the computing device 16, and a certificate is not provided to the computing device 16.

Figure 10:
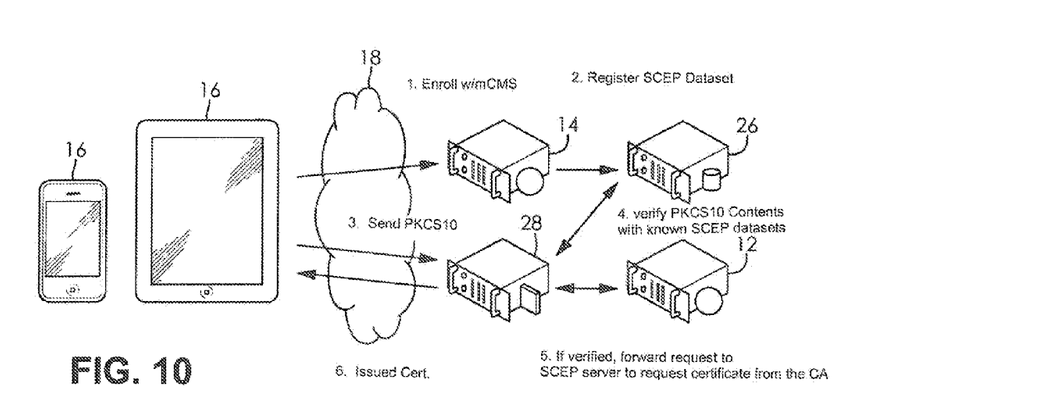
FIG. 10 is a schematic view of a data security system for receiving requests from computing devices via a communication network according to a further illustrated embodiment of the present invention.

FIG. 10 illustrates a data security system 10D for validating SCEP certificate enrollment requests according to a fifth illustrated embodiment of the present invention. The data security system 10D according to the second illustrated embodiment is substantially the same as the data security system 10 according the first illustrated embodiment described hereinabove except that it utilizes a SCEP Proxy 28 that only permits certificate requests to pass to the SCEP Server 12 if the certificate request is valid. With this embodiment, V-SCEP technology is directly integrated into a SCEP Proxy 28. The computing devices 16 first enroll with mCMS residing in the Web Server 14 via the communication network 18. During this enrollment, a SCEP Dataset is registered in a central database 26. For certificate issuance, the computing device 16 generates and sends its PKCS 10 request to the SCEP Proxy 28. The SCEP Proxy 28 compares the contents of the PKCS 10 request from the computing device 16 with the registered SCEP Datasets in the database 26. If verification of the request contents is successful, the SCEP Proxy 28 forwards the SCEP request to the actual SCEP Server 12. The SCEP Server 12 then issues the certificate and returns the certificate contents to the SCEP Proxy 12 that sends the issued certificate to the computing device 16.

It is noted that each of the features and variations of the above illustrated embodiments can be used in any combination with each of the other illustrated embodiments.

From the foregoing disclosure it is apparent that the above described data security system and method address the theoretical privilege-escalation vulnerability in prior SCEP—based systems that could lead to a practical attack. It is also apparent that the above described system and method address this vulnerability in both a performance effective manner and a cost effective manner. It is further apparent that the validation steps can be provided and performed in any suitable manner such as for example, the software performing the validation steps can reside in any suitable component at any suitable location within the system.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A computer implemented method for validating SCEP certificate enrollment requests, said method comprising the steps of, in combination:
   (a) electronically receiving a request via a communications network from a trusted user to preregister for a SCEP challenge to be used in a subsequent certificate request and, in response to the request, generating and storing the SCEP challenge and associated expected certificate content for the SCEP challenge;
   (b) electronically sending the SCEP challenge via the communications network to the requesting trusted user;
   (c) after steps (a) and (b), electronically receiving a certificate request including the SCEP challenge via the communications network;
   (d) electronically validating the certificate request by checking whether the SCEP challenge of the certificate request was preregistered and if so checking whether content of the certificate request matches the preregistered expected certificate content associated with the preregistered SCEP challenge;
   (e) after step (d), authorizing a certificate for the certificate request if the SCEP challenge of the certificate request was preregistered and the content of the certificate request matches the preregistered expected certificate content associated with the preregistered SCEP challenge, and generating and electronically sending the certificate via the communications network to a sender of the certificate request; and (f) after step (e), denying the certificate request if the SCEP challenge of the certificate request was not preregistered or if the content of the certificate request does not match the preregistered expected certificate content associated with the preregistered SCEP challenge.

2. The computer implemented method according to claim 1, wherein the certificate request is a PKCS#10 certification request.

3. The computer implemented method according to claim 1, wherein the validation step is performed by a SCEP Validation Service.

4. The computer implemented method according to claim 3, wherein the certificate request is received via the communication network by a SCEP Server which sends the certificate request to a Certificate Authority which communicates with the SCEP Validation Service to validate the certificate request.

5. The computer implemented method according to claim 4, wherein the Certificate Authority communicates with the SCEP Validation Service via a SCEP Enforcement Module.

6. The computer implemented method according to claim 4, wherein the SCEP Enforcement Module is implemented as a Policy Module for the Certificate Authority.

7. The computer implemented method according to claim 6, wherein the SCEP Enforcement Module passes all communications through unless a certificate request containing a SCEP challenge is received.

8. The computer implemented method according to claim 3, wherein the SCEP Validation Service is implemented as a Service-Oriented Architecture component.

9. The computer implemented method according to claim 5, wherein the certificate request is received via the communication network by a SCEP Server which sends the certificate request to the SCEP Validation Service for validation prior to sending the certificate request to a Certificate Authority.

10. The computer implemented method according to claim 1, wherein the certificate request is received via the communication network by a SCEP Server which validates the certificate with software residing in the SCEP Server prior to sending the certificate request to a Certificate Authority.

11. The computer implemented method according to claim 1, wherein the certificate request is received via the communication network by a SCEP Server which sends the certificate request to a Certificate Authority which validates the certificate request with software residing in the Certificate Authority prior to authorizing the certificate request.

12. A system for validating SCEP certificate enrollment requests, said system comprising, in combination:

a SCEP Server for electronically receiving a request via a communications network from a trusted user to preregister for a SCEP challenge to be used in a subsequent certificate request and for electronically receiving a certificate request including the SCEP challenge via the communication network;

a SCEP Issuance System for electronically sending the SCEP challenge via the communication network to the trusted user;

a SCEP Validation Service for storing the SCEP challenge and associated expected certificate content for the SCEP challenge and for validating the certificate request by checking whether the SCEP challenge of the certificate request was preregistered and, if so, checking whether content of the certificate request matches the preregistered expected certificate content associated with the preregistered SCEP challenge;

wherein the certificate request is validated by the SCEP Validation Service and a certificate is authorized for the certificate request if the SCEP challenge of the certificate request was preregistered and the content of the certificate request matches the preregistered expected certificate content associated with the preregistered SCEP challenge; and wherein the certificate request is not validated by the SCEP Validation Service and the certificate request is denied if the SCEP challenge of the certificate request was not preregistered or if the content of the certificate request does not match the preregistered expected certificate content associated with the preregistered SCEP challenge.

13. The system according to claim 12, wherein the certificate request is a PKCS#10 certification request.

14. The system according to claim 12, further comprising a Certificate Authority which receives the certificate request from the SCEP Server and communicates with the SCEP Validation Service to validate the certificate request.

15. The system according to claim 14, wherein the Certificate Authority includes a SCEP Enforcement Module for communicating with the SCEP Validation Service.

16. The system according to claim 15, wherein the SCEP Enforcement Module is implemented as a Policy Module for the Certificate Authority.

17. The system according to claim 16, wherein the SCEP Enforcement Module passes all communications through unless a certificate request containing a SCEP challenge is received.

18. The system according to claim 12, wherein the SCEP Validation Service is implemented as a Service-Oriented Architecture component.

19. The system according to claim 12, wherein SCEP server sends the certificate request to the SCEP Validation Service for validation prior to sending the certificate request to a Certificate Authority.

20. A system for validating SCEP certificate enrollment requests, said system comprising, in combination:

a SCEP Server for electronically receiving a request via a communications network from a trusted user to preregister for a SCEP challenge to be used in a subsequent certificate request and for electronically receiving a certificate request including the SCEP challenge via the communication network;

a SCEP Issuance System for issuing for electronically sending the SCEP challenge via the communication network to the trusted user;

validation software configured to store the SCEP challenge and associated expected certificate content for the SCEP challenge and to validate the certificate request;

wherein the validation software validates the certificate request by checking whether the SCEP challenge of the certificate request was preregistered and, if so, checking whether content of the certificate request matches the preregistered expected certificate content associated with the preregistered SCEP challenge;

wherein the validation software validates the certificate request and authorizes a certificate for the certificate request if the SCEP challenge of the certificate request was preregistered and the content of the certificate request matches the preregistered expected certificate content associated with the preregistered SCEP challenge; and wherein the validation software does not validate the certificate request and the certificate request is denied if the SCEP challenge of the certificate request was preregistered or the content of the certificate request does not match the preregistered expected certificate content associated with the pregistered SCEP challenge.

21. The system according to claim 20, wherein the certificate request is a PKCS#10 certification request.

22. The system according to claim 20, further comprising a Certificate Authority which receives the certificate request from the SCEP Server.

23. The system according to claim 22, wherein the validation software resides in the Certificate Authority.

24. The system according to claim 20, wherein the validation software resides in the SCEP Server.

* * * * *